July 25, 1967  R. BROUÉE  3,333,130
HOMOPOLAR ELECTRIC MACHINES
Filed Oct. 29, 1964  3 Sheets-Sheet 2

July 25, 1967   R. BROUÉE   3,333,130
HOMOPOLAR ELECTRIC MACHINES
Filed Oct. 29, 1964   3 Sheets-Sheet 3

United States Patent Office 3,333,130
Patented July 25, 1967

3,333,130
HOMOPOLAR ELECTRIC MACHINES
Roger Brouée, Sevres, France, assignor to Societe d'Exploitation des Materiels Hispano-Suiza, Bois Colombes, Seine, France, a society of France
Filed Oct. 29, 1964, Ser. No. 407,326
Claims priority, application France, Oct. 31, 1963, 952,479
4 Claims. (Cl. 310—178)

The present invention relates to homopolar electric machines and more especially homopolar electric generators, such generators being generally intended to produce currents of very high intensity, reaching, for instance, several tens, and possibly even several hundreds, of thousands of amperes.

It is known that such machines generally comprise a stationary annular pole piece which acts as an inductor and a rotor consisting of at least one massive metallic cylindrical element in which are induced electromotive forces giving rise to induced currents which are collected by means of collector rings. Considering the central air gap of the machine, the rotor, on either side of said air gap, has opposed polarities. Generally, the current collectors, whatever be their nature, are located on either side of the central air gap, respectively.

As one half of the magnetic flux is caused to flow back to the annular pole piece in each of the lateral air gaps between the stator and the rotor located on either side of the central air gap, the induced electromotive force in the rotor through each of said lateral air gaps will be equal to one half of the electromotive force induced in the rotor through the main air gap.

Now, up to this time, only the currents created by the electromotive force induced through the main air gap were used, contact with the rotor being ensured through solid or liquid collector rings.

The chief object of the present invention is to provide a machine of the above mentioned type which is better adapted to meet the requirements of practice than those of the same type used up to now, in particular concerning the efficiency of their collectors and their power by unit of mass.

In a machine according to the present invention, each of the collectors is constituted by an electricity conducting liquid, for instance mercury, sodium, or sodium-potassium, in contact with the rotor and the stator of said machine, said conducting liquid being contained in a gutter-shaped ring belonging to the stator.

According to a feature of the present invention, each of said liquid collectors also constitutes a fluid bearing for said rotor.

According to another feature of the present invention, in a homopolar electric machine comprising input collector means and output collector means, respectively located on either side of the central air gap of the machine the rotor of which consists of a single cylindrical element made of an electricity conducting metal, there are four supplementary collector means, disposed on either side of the two lateral air gaps of the machine, those of said four supplementary collector means that are located at the inner ends of the lateral air gaps being advantageously combined with the two corresponding collector means disposed on either side of the main air gap, respectively, in such manner as to form a collector device located between the main air gap and each of the lateral air gaps, whereby the electric power collected at the terminals of the machine is substantially doubled.

Preferred embodiments of the present invention will be hereinafter described with reference to the appended drawings, given merely by way of example, and in which.

Figure 1:
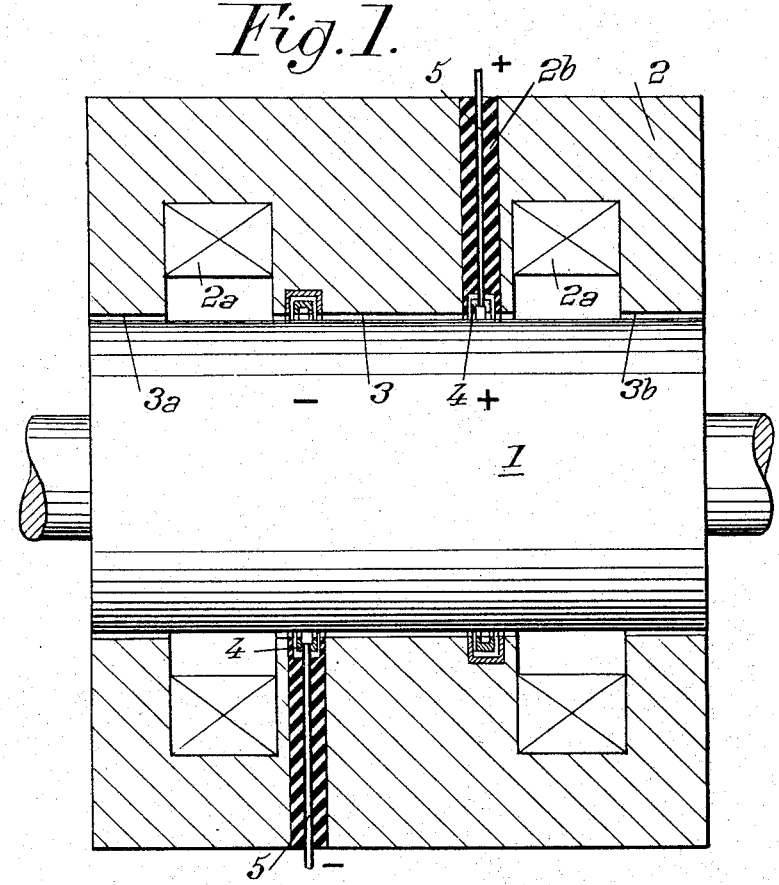
FIG. 1 is a diagrammatic longitudinal sectional view of a homopolar electric generator made according to the present invention.

A homopolar electric generator according to the present invention comprises a rotor 1 and a stator 2 consisting of an annular pole piece provided with energizing coils $2_a$. Between this rotor 1 and this stator 2 are provided a central air gap 3 and two lateral air gaps $3_a$ and $3_b$.

The machine further comprises two collector means carried by stator 2, disposed respectively on either side of the central air gap 3 and each of which comprises a ring 4 having the shape of a gutter the groove or opening of which is turned toward rotor 1. Said ring 4 is fed with an electricity conducting liquid such for instance as mercury, sodium, or sodium-potassium.

According to one feature of the present invention, the electricity conducting liquid forming a liquid sheet extending along the whole of the corresponding ring 4 simultaneously acts as a liquid bearing for the rotor.

Advantageously, as shown, the liquid sheet is caused to form a film at the places where the collecting contact is to take place and, for this purpose, the bottom of the gutter forms, in the portions thereof where the current collecting effect is to be ensured, projections $4_a$ (FIG. 3), each of which forms a restricted passage between, on the one hand, a chamber A to which the conducting liquid is fed through a conduit pipe 5 provided in stator 2, and, on the other hand, a discharge chamber B connected to a liquid outlet system $5_a$, also provided in stator 2.

There are, for instance, provided four such projections.

In a collector system of this type, a sufficiently high conducting liquid feed pressure may be used (the bearing being purely hydrostatic). However it seems preferable to give projections $4_a$ circumferential dimensions such that the bearing can work either as a purely hydrodynamic bearing or as a combined hydrostatic and hydrodynamic bearing.

In order to obtain an automatic centering of rotor 2, the liquid feed conduits 5 opening into chamber A may be provided with local throttled passages 6.

Figure 2:
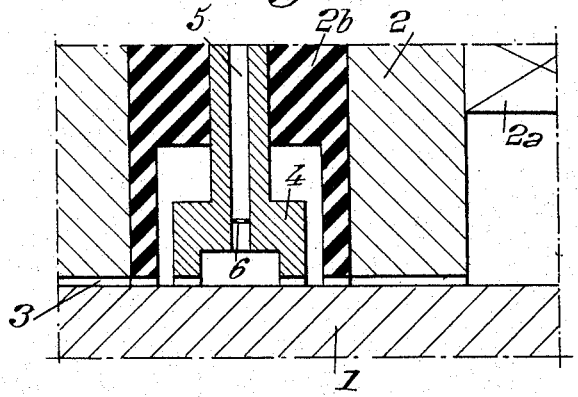
FIG. 2 is a longitudinal sectional view on an enlarged scale showing a portion of the machine of FIG. 1.
Figure 3:
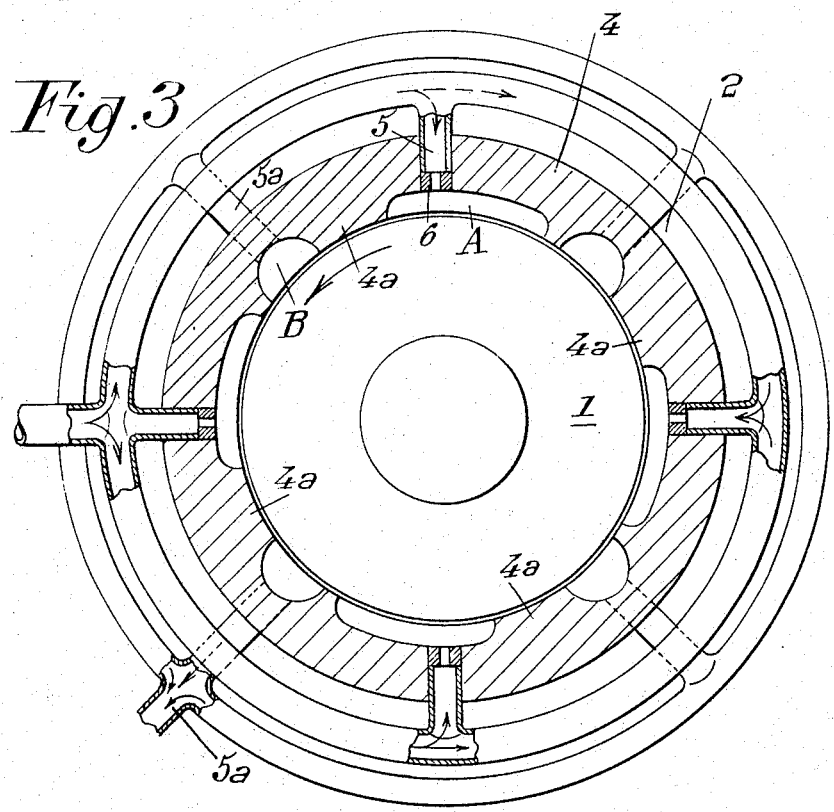
FIG. 3 is a diagrammatic cross sectional view corresponding to FIG. 1, in the plane of a collector.

Rings 4 and conduits 5 and $5_a$ may be made of a material which is a good conductor of electricity, for instance copper or aluminium, said rings 4 and conduits 5 and $5_a$ being electrically insulated from stator 2 by an insulating material $2_b$, as shown by FIGS. 1, 2 and 3.

It has been supposed, in what precedes, that the homopolar generator comprises only two liquid contacts disposed on either side, respectively, of the central air gap 3. This arrangement permits of course of collecting only the electromotive force E induced opposite the central air gap 3.

Figure 4:
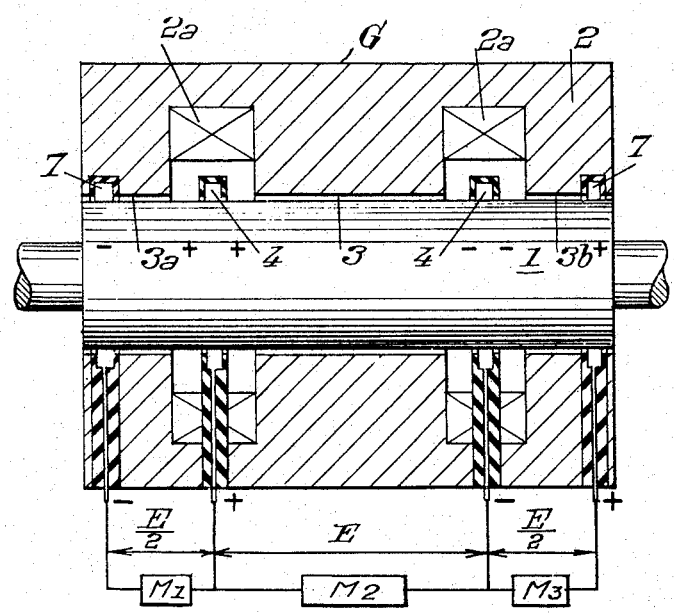
FIG. 4 is a diagrammatic longitudinal view of a homopolar electric generator illustrating another feature of the invention.

But it is also possible, according to another feature of the invention, to collect the electromotive forces $E/2$ induced opposite the lateral air gaps $3_a$ and $3_b$ by providing at the ends of stator 2, as shown by FIG. 4, two supplementary collectors supposed to be in the form of liquid collectors 7 similar to the main collectors 4. Each of these supplementary collectors 7 cooperates with the main collector 4 located adjacent it, to close the circuit through which is collected the electromotive force $E/2$ induced opposite the corresponding lateral air gap $3_a$ or $3_b$.

Thus, in addition to the collection of the electromotive forces induced at the level of the lateral air gaps, there is obtained the effect of two supplementary fluid bearings for rotor 1.

It might be possible, instead of causing the supplementary collectors to cooperate with the main collectors, to provide, in the vicinity of said main collectors, other supplementary collectors ensuring, in cooperation with the end collectors 7, the collection of the electromotive forces corresponding to the lateral air gaps.

Anyway the provision of supplementary collectors permits of doubling the electric power that is obtained since to the central electromotive force E are added the lateral electromotive forces, each of which is equal to $E/2$.

It should be pointed out that the provision of four collectors (two main collectors and two end collectors) permits, according to the manner in which the machine serving to use the current is connected with said collectors, of disposing of the three following electromotive forces $E/2$, $E$ and $E/2$.

Concerning the receiver machines used with such a homopolar generator, they may be of any type requiring high current densities. In particular, such a machine may comprise, as shown by FIG. 4, a group of three homopolar motors $M_1$, $M_2$ and $M_3$, of the same type as the generators and respectively fed with voltages equal to $E/2$, $E$ and $E/2$.

Figure 5:
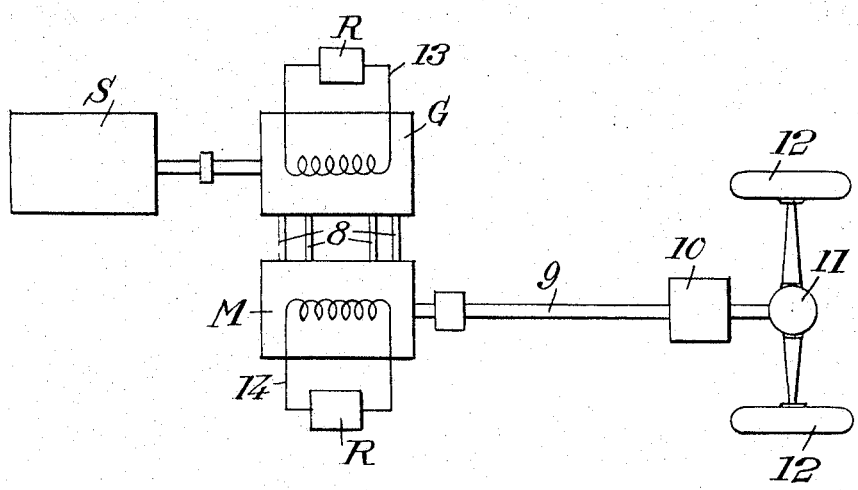
FIG. 5 shows an example of application of a homopolar electric machine according to the present invention.

Another feature of the invention consists in utilizing, as receiver machine, a homopolar electric motor identical to the generator. This arrangement, which constitutes an electrical torque transmission between a source of mechanical energy and a receiver to be driven from said source may be used in an automobile vehicle as diagrammatically illustrated by FIG. 5.

The rotor of a homopolar generator G according to the present invention is coupled to the output shaft of an internal combustion engine S. The output terminals of said generator G are connected to the input terminals of a homopolar motor M identical to the generator.

It is pointed out that it is advantageous to dispose motor M as close as possible to generator G, the electrical connection between G and M taking place through copper or aluminium bars 8.

The rotor of homopolar motor M is coupled with a conventional mechanical transmission including a transmission shaft 9, a speed reducing gear 10 and a bevel gear 11 through which the wheels 12 of the vehicle are driven.

Each of the two homopolar machines G and M has its own inductor circuit, respectively 13 and 14, and there is advantageously provided, in each of these two inductor circuits, a regulating device R responsive, on the one hand, to the speed of revolution of homopolar motor M and, on the other hand, to the torque supplied by said motor.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. A homopolar electric generator which comprises, in combination, a stator provided with a cylindrical recess, a cylindrical rotor fitting in said recess coaxially thereto, with an annular air gap between it and the wall of said cylindrical recess, two liquid bearings for said rotor carried by said stator, at a distance from each other along the axis of said stator, at least two other liquid bearings for said rotor carried by said stator, respectively on either side of the space between said two first mentioned bearings, each of said liquid bearings including a gutter-shaped ring carried in fixed position by said stator and coaxial with said cylindrical recess, said ring forming a groove turned toward the axis of said cylindrical recess, a liquid between the bottom of said groove and said rotor to bear said rotor, means for feeding said liquid to said ring, said liquid being electricity conducting and forming a conductor for the current flowing through said rotor, the bottom of said groove including a plurality of noncontiguous cylindrical portions coaxial with said rotor and close thereto so as to leave a restricted passage for said liquid between each of said cylindrical portions and said rotor, said groove forming, on each side of each of said cylindrical portions, two chambers of substantial radial thickness, conduit means carried by said stator for feeding said liquid to one of said two chambers and conduit means carried by said stator for evacuating said liquid from the other of said two chambers.

2. A homopolar electric machine which comprises, in combination, a stator provided with a cylindrical recess, a cylindrical rotor fitting in said recess coaxially thereto with an annular air gap between it and the wall of said cylindrical recess, two liquid bearings for said rotor carried by said stator at a distance from each other along the axis of said stator, each of said liquid bearings including a gutter-shaped ring carried in fixed position by said stator and coaxial with said cylindrical recess, said ring forming a groove turned toward the axis of said cylindrical recess, a liquid between the bottom of said groove and said rotor to bear said rotor, said liquid being electricity conducting and forming a conductor for the current flowing through said rotor, the bottom of said groove including a plurality of noncontiguous cylindrical portions coaxial with said rotor and close thereto so as to leave a restricted passage for said liquid between each of said cylindrical portions and said rotor, said groove forming, on each side of each of said cylindrical portions, two chambers of substantial radial thickness, conduit means carried by said stator for feeding said liquid to one of said two chambers and conduit means carried by said stator for evacuating said liquid from the other of said two chambers.

3. A machine according to claim 2 wherein the number of said cylindrical portions of the bottom of each of said grooves is four.

4. A machine according to claim 2 wherein said first mentioned conduit means include a throttled passage upstream of the corresponding chamber.

References Cited

UNITED STATES PATENTS

| 1,916,256 | 7/1933 | Chandeysson | 310—178 |
| 2,408,080 | 9/1946 | Lloyd | 310—102 |
| 2,869,007 | 1/1959 | Ringland | 310—178 |
| 3,211,936 | 10/1965 | Harvey | 310—178 |

FOREIGN PATENTS

| 927,394 | 5/1963 | Great Britain. |

OTHER REFERENCES 141,359 printed 1921, Great Britain.

ORIS L. RADER, *Primary Examiner.*

G. SIMMONS, *Assistant Examiner.*